(12) United States Patent
Germain

(10) Patent No.: US 9,837,759 B2
(45) Date of Patent: Dec. 5, 2017

(54) WIRESTRAIN RELIEF TO USE ON A LIGHT EMITTING DIODE LINEAR MODULE

(71) Applicant: GE Lighting Solutions, LLC, East Cleveland, OH (US)

(72) Inventor: Steve Germain, Quebec (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 257 days.

(21) Appl. No.: 13/925,863

(22) Filed: Jun. 25, 2013

(65) Prior Publication Data

US 2014/0377987 A1     Dec. 25, 2014

(51) Int. Cl.

| H01R 13/00 | (2006.01) |
| H01R 13/60 | (2006.01) |
| H01R 13/58 | (2006.01) |
| H02G 15/007 | (2006.01) |
| H02G 3/32 | (2006.01) |

(52) U.S. Cl.
CPC .......... *H01R 13/60* (2013.01); *H01R 13/5829* (2013.01); *H01R 13/5833* (2013.01); *H02G 3/32* (2013.01); *H02G 15/007* (2013.01)

(58) Field of Classification Search
CPC ............ H01R 13/58; H01R 13/5804–13/5812; H02G 3/00; H02G 15/007; F16L 3/24; F21V 23/001–23/002; F21V 29/80
See application file for complete search history.

(56) References Cited

U.S. PATENT DOCUMENTS

| 5,675,128 A | 10/1997 | Simon |
| 2006/0270269 A1 | 11/2006 | Quintanilla |
| 2007/0066123 A1 | 3/2007 | Arlitt et al. |
| 2009/0321588 A1 | 12/2009 | Sullivan |
| 2012/0037402 A1* | 2/2012 | Kawase ............... H01R 4/2433 |
| | | 174/135 |
| 2012/0220161 A1* | 8/2012 | Mostoller ............... F21V 27/02 |
| | | 439/460 |

(Continued)

FOREIGN PATENT DOCUMENTS

| EP | 1248320 A2 | 10/2002 |
| EP | 1521024 A1 | 4/2005 |

(Continued)

OTHER PUBLICATIONS

European Search Report and Written Opinion issued in connection with corresponding EP Application No. 14172596.0 dated Oct. 30, 2014.

*Primary Examiner* — Sean Gramling
*Assistant Examiner* — Gerald J Sufleta, II
(74) *Attorney, Agent, or Firm* — Peter T. DiMauro; GE Global Patent Operation

(57) ABSTRACT

Provided is a connection housing including a first plate having a connecting member for slidably connecting the first plate to an electrical assembly. The first plate includes a ridge portion formed across a threading path. A second plate has an opening for non-slidably connecting the second plate to the electrical assembly. The second plate includes a valley portion positioned in opposing relation to the ridge portion. The first and second plates are configured for (i) facilitating placement of a wire along the threading path and (ii) folding onto each other to restrict movement of the wire after the folding.

13 Claims, 5 Drawing Sheets

(56) References Cited

U.S. PATENT DOCUMENTS

Figure 1:
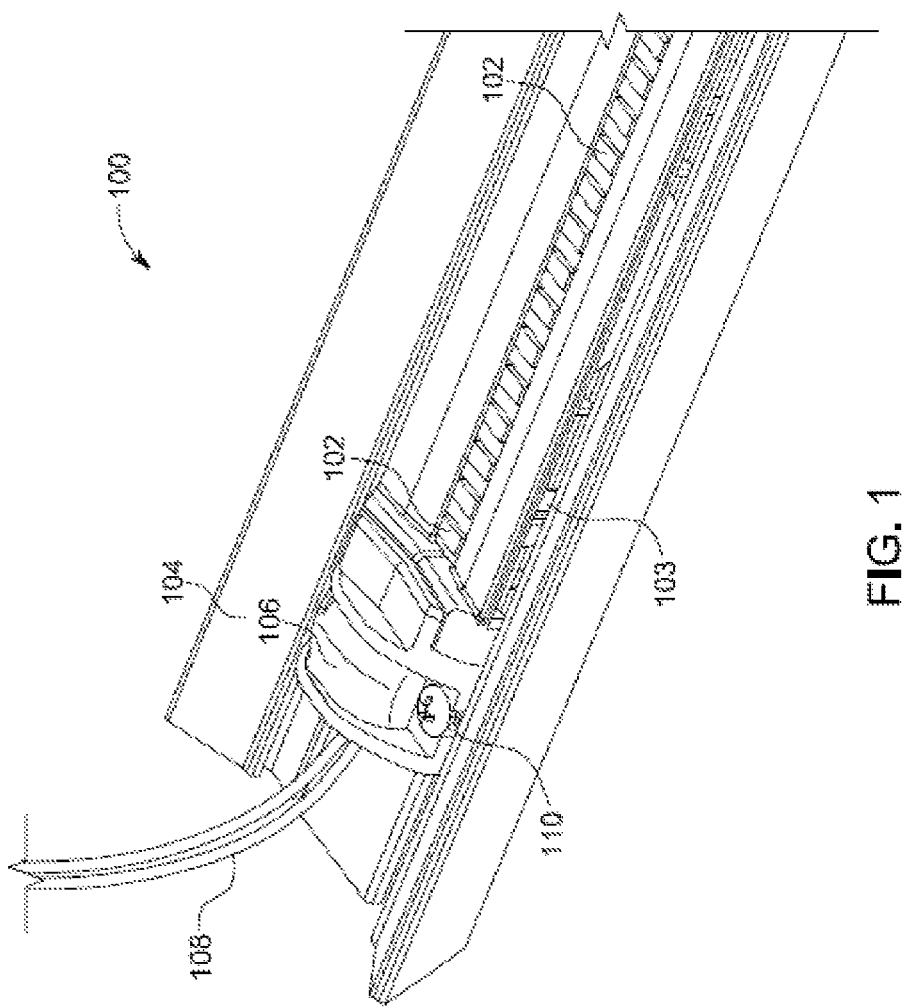

2013/0233612 A1* 9/2013 Pimentel .............. H02G 15/007
          174/545
2016/0134092 A1* 5/2016 Bonvallat ............ H05K 5/0247
          248/68.1

FOREIGN PATENT DOCUMENTS

EP      1764871 A1   3/2007
WO   20130050064 A1   4/2013

* cited by examiner

WIRESTRAIN RELIEF TO USE ON A LIGHT EMITTING DIODE LINEAR MODULE

I. FIELD OF THE INVENTION

The present invention relates generally to lighting assemblies. More particularly, the present invention relates to safety and reliability of light emitting diode (LED) linear module assemblies.

II. BACKGROUND OF THE INVENTION

Conventional LED linear modules typically include a solid state lighting module having a substrate with a lighting source disposed thereon. For example, the lighting source can include an LED linear module including an LED array mounted on a printed circuit board (PCB) and an aluminum extrusion as a heat sink.

The heat sink is used to facilitate cooling of the PCB, which is typically connected to the heat sink via wires. As understood by those of skill in the art, the electrical connection between the wires, the PCB, and the heat sink can occur via soldering or through use of contact pads. Over time, this electrical connection can become faulty. For example, strains on the wires, created through use or servicing, can cause the wires to become dislodged from the contact pads or cause the soldering to fail.

Failure of the electrical connections can cause the LED array to fail outright, or over time, reduce its reliability of forming an intermittent connection. Additionally, dislodged wires can create the risk of electrical shock when using or servicing the LED array.

III. SUMMARY OF EMBODIMENTS OF THE INVENTION

Given the aforementioned deficiencies, a need exists for more reliable connections between the PCB of an LED linear module and a heat sink. More specifically, a need exists for methods and systems to facilitate more reliable and safer connections between the LED array, PCB, and the heat sink.

In the embodiments, a connection housing includes a first plate having a connecting member for slidably connecting the first plate to a light assembly. The first plate includes a ridge portion formed across a threading path. A second plate has an opening for non-slidably connecting the second plate to the electrical assembly. The second plate includes a valley portion positioned in opposing relation to the ridge portion. The first and second plates are configured for (i) facilitating placement of a wire along the threading path and (ii) folding onto each other to restrict movement of the wire after the folding.

In some instances, embodiments of the present invention provide a wire strain relief device that consists on a flexible injected portion. This device can be formed by two parts joined by a living hinge. This allows the mechanism to fold on itself on the wire forcing it to bend and providing the strain relief feature.

The strain relief device can slide on a built in feature on an extruded heat sink constructed, for example, of aluminum. The strain relief device is held into place on one side, while the other side on the strain relief is held in place by a screw that goes also in the aluminum heat sink. The screw also provides a force to maintain the strain relief in a closed position. The part is also shaped in a way that when it is in the closed position, it will cover the wire connections on the LED board.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

FIG. 1. is an illustration of a light assembly including a connection mechanism constructed and arranged in accordance with an embodiment of the present invention.

Figure 2:
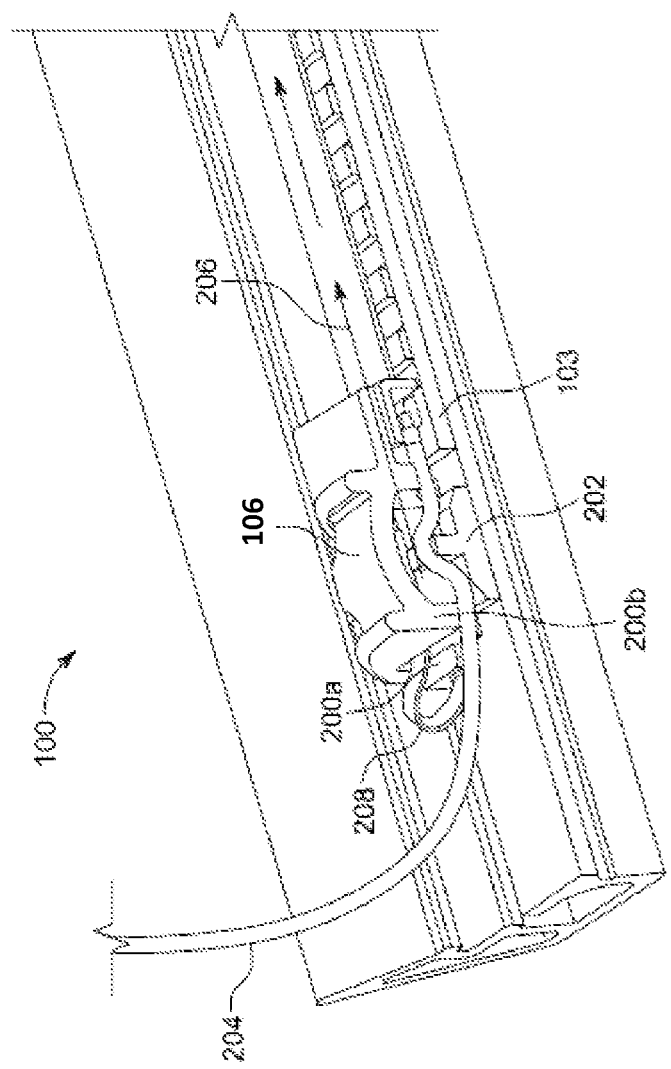

FIG. 2. is an illustration of a partial perspective view of the light assembly and connection mechanism in FIG. 1.

Figure 3:
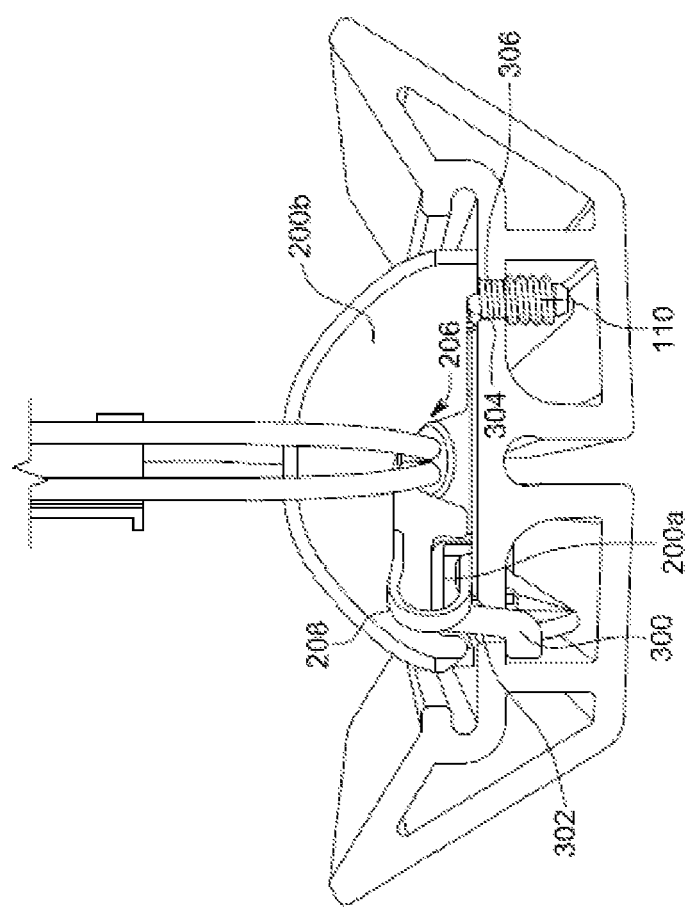

FIG. 3. is an illustration of a cutaway view of the light assembly and connection mechanism of FIG. 1, viewed along a threading direction.

Figure 4:
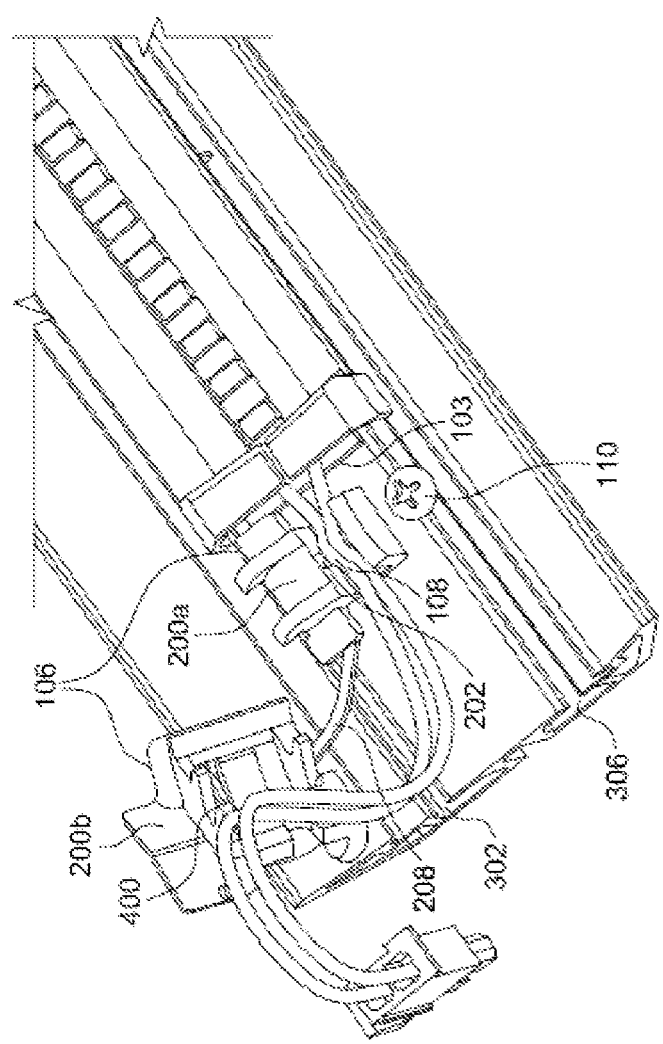

FIG. 4 is an exploded view of the connection mechanism of FIG. 1 in accordance with the embodiments.

Figure 5:
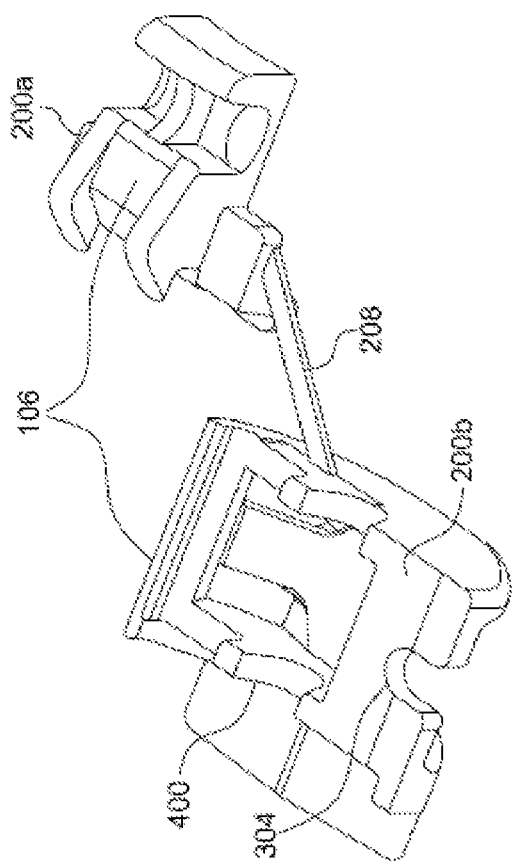

FIG. 5. is a more detailed illustration of a connection mechanism constructed in accordance with an embodiment of the present invention.

V. DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1. is an illustration of an LED linear module 100 including an LED array 102 mounted on a PCB 103. As noted above, embodiments of the present invention provide an LED linear module consisting of the LED array 102 mounted on the PCB 103, and together, mounted on an aluminum extrusion 104, such as a heat sink.

A connection mechanism, such as a wire strain device in accordance with the embodiments, provides relief of the electrical connections as it forms a cover over the wire connection on the PCB 103. Such a wire strain device would be simple to produce as it could be made of plastic, or other similar material The device would also be easy to install, and includes a built in safety feature.

Additionally, a wire strain device in accordance with the embodiments also provides strain relief with the LED module wires by solidly attaching them to an electrical assembly, such as the aluminum heat sink. By restricting the inadvertent motion of the wires, embodiments of the present invention can forestall failure of the electrical connections, thus increasing the reliability of the LED linear module. Additionally, the embodiments help to prevent the dislodging of wires, thus reducing the risk of electrical shock when using or servicing the LED array 102.

More specifically, the embodiments provide a wire strain relief device that consists on a flexible injected portion constructed of a material, such as plastic. This device can be formed by two parts joined by a living hinge. This allows the mechanism to fold onto itself and then on the wire, forcing it to bend and providing the strain relief feature.

In FIG. 1, the PCB 103 is affixed to a heat sink 104. In the exemplary illustration of FIG. 1, the heat sink 104 is formed of aluminum. A connection mechanism 106 facilitates the connection of wires 108 to the PCB 103.

A fastening device, such as a screw 110, forms a non-slidable connection between the connection mechanism 106 and the heat sink 104. This process is described in greater detail below.

FIG. 2. is an illustration of a partial perspective view of the LED linear module 100 of FIG. 1. In FIG. 2, the connection mechanism 106 (e.g., wire strain clamp) includes a first plate 200A and a second plate 200B. The first and second plates, 200A and 200B, are described in greater detail below.

The first plate 200A includes a ridge portion 202 that serves to obstruct the movement of a wire 204, thus preserving its connection to the PCB 103.

As shown in FIG. 2, the wire 204 is positioned within the connection mechanism 106 along a connection path 206. A flexible hinge 208 connects the first plate 200A to the second plate 200B, permitting the first and second plates, to fold onto themselves, forcing the wire 204 to bend across the ridge portion 202 and provide the strain relief feature. In FIG. 2, the wire 204 can be connected to the PCB 103 via soldering or through numerous other connection approaches, well known to those of skill in the art.

FIG. 3. is a cutaway view of the LED linear module 100 and connection mechanism 106, along the threading direction 206. As illustrated in FIG. 3, the first plate 200A includes a protruding member 300 for facilitating a slidable connection between the first plate 200A and the heat sink 104, along a first connection track 302. The second plate 200B includes an opening 304 to facilitate a non-slidable connection between the second plate 200B and a heat sink 104 along a second connection track 306.

As used herein, the term non-slidable connection is intended to describe a more permanently affixed connection between the second plate 200B and the heat sink 104. For example, the screw 110, or similar fastening mechanism, can be used to affix the second plate 200B to the heat sink 104 along the second connection track 306.

FIG. 4 is an exploded view of the connection mechanism 106, and related components, in accordance with the embodiments. In FIG. 4, for example, the second plate 200B includes a valley portion 400 that is positioned in opposing relationship to the ridge portion 202, of first plate 200A, when the second plate 200B folds onto the first plate 200A. As noted above, the opposing connection between the ridge portion 202 and the valley portion 404 creates the restriction to movement of the wires 108, thus creating the strain.

The protruding member 300 facilitates formation of a slidable connection between the first plate 200A and the heat sink 104, along the first connection track 302. Conversely, the screw 110 facilitates formation of a non-slidable connection between the second plate 200B and heat sink 104, the second connection track 306.

FIG. 5. is a more detailed illustration of the connection mechanism 106 constructed in accordance with an embodiment of the present invention. In FIG. 5, for example, a clearer view of the flexible hinge 208 is shown. Also, the opening 304, through which the screw 110 can be positioned, and the valley portion 400, are more clearly depicted.

CONCLUSION

A wire strain device, in accordance with the embodiments, provides relief as it forms a cover the wire connection on the PC board. Such a wire strain device would be simple to produce as it could be made of plastic, or other similar The device would also be easy to install, and includes a built in safety feature.

Additionally, a wire strain device in accordance with the embodiments also provides strain relief with the LED module wires by solidly attaching them to an electrical assembly, such as aluminum extruded heat sink. By restricting the motion of the wires, embodiments of the present invention can forestall failure of the electrical connections, thus increasing the reliability of the LED array. Additionally, the embodiments help to prevent the dislodging of wires, thus reducing the risk of electrical shock when using or servicing the LED array 102. In an exemplary embodiment, an advantage of constructing the device of a material, such as plastic, is at the device can be manufactured at a reasonably low cost.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A connection housing, comprising:
a first plate having a connecting member for slidably connecting the first plate to a heat sink, wherein the first plate slidably connects to the heat sink via a first connection track, the first plate including a ridge portion formed across a threading path wherein the ridge portion protrudes above the first plate to obstruct movement of a wire along the threading path wherein the threading path is parallel to the first connection track; and
a second plate having an opening for non-slidably connecting the second plate to the heat sink, the second plate including a valley portion formed in opposing relation to the ridge portion to further facilitate the obstruction of movement of the wire;

wherein the first and second plates are configured for (i) facilitating bending of the wire along the threading path and (ii) folding onto each other to restrict movement of the wire after the folding;

the connection housing further comprising an electrical assembly including a light fixture.

2. The connection housing of claim 1, wherein the connection housing is formed via plastic injection.

3. The connection housing of claim 1, wherein the second plate connects to the heat sink along a second connection track.

4. The connection housing of claim 1, further comprising a flexible hinge connecting the first and second plates.

5. The connection housing of claim 1, wherein the first plate includes a protruding member configured to form the slidable connection via the first connection track.

6. A connection housing, comprising:
a first plate having a connecting member for slidably connecting the first plate to a heat sink, wherein the first plate slidably connects to the heat sink via a first connection track, the first plate including a ridge portion formed across a threading path wherein the ridge portion protrudes above the first plate to obstruct movement of a wire along the threading path, wherein the threading path is parallel to the first connection track; and a second plate (i) configured for folding onto the first plate and (ii) having an opening for non-slidably connecting the second plate to the heat sink, the second plate including a valley portion formed in opposing relation to the ridge portion to further facilitate the obstruction of movement of the wire;

wherein the first and second plates are configured for facilitating bending of the wire across the ridge portion;

the connection housing further comprising an electrical assembly including a light fixture.

7. The connection housing of claim 6, wherein the folding restricts movement of the wire after the folding.

8. The connection housing of claim 6, wherein the connection housing is formed via plastic injection.

9. The connection housing of claim 7, wherein the second plate connects to the heat sink along a second connection track.

10. The connection housing of claim 7, further comprising a flexible hinge connecting the first and second plates.

11. The connection housing of claim 7, wherein the first plate includes a protruding member configured to form the slidable connection via the first connection track.

12. The connection housing of claim 4, wherein the flexible hinge permits the first and second plates to fold onto each other, forcing the wire to bend across the ridge portion of the first plate to restrict movement of the wire.

13. The connection housing of claim 10, wherein the flexible hinge permits the first and second plates to fold onto each other, forcing the wire to bend across the ridge portion of the first plate to restrict movement of the wire.

* * * * *